United States Patent
Butler

[15] 3,666,299
[45] May 30, 1972

[54] FLEXIBLE JOINT INCLUDING BRAKING MEANS

[72] Inventor: James W. Butler, 117 Grant Avenue, Pittsburgh, Pa. 15202

[22] Filed: Oct. 31, 1969

[21] Appl. No.: 873,766

Related U.S. Application Data

[63] Continuation-in-part of Ser. No. 311,785, July 26, 1963, abandoned.

[52] U.S. Cl. ..................................287/94, 3/26, 3/27, 188/72.7, 188/82.9
[51] Int. Cl. .................................................B25g 3/38
[58] Field of Search ..............188/70 R, 70 B, 74, 71.1, 71.2, 188/72.7, 72.8, 82.9, 82.74, 134, 16, 192; 287/94, 99, 100; 3/26, 27

[56] References Cited

UNITED STATES PATENTS

| 2,646,793 | 7/1953 | Swiech et al. | 287/99 X |
| 2,894,610 | 7/1959 | Harrington | 188/134 X |
| 3,237,724 | 3/1966 | Kershner et al. | 188/72.7 X |

*Primary Examiner*—George E. A. Halvosa
*Attorney*—Robert U. Geib, Jr.

[57] ABSTRACT

Rotatable driving and driven elements of the screw-and-threaded-sleeve type are provided with means for securing relative rotation therebetween, together with means for enabling braking or cessation, at selected intervals, of rotation with respect to each other.

17 Claims, 6 Drawing Figures

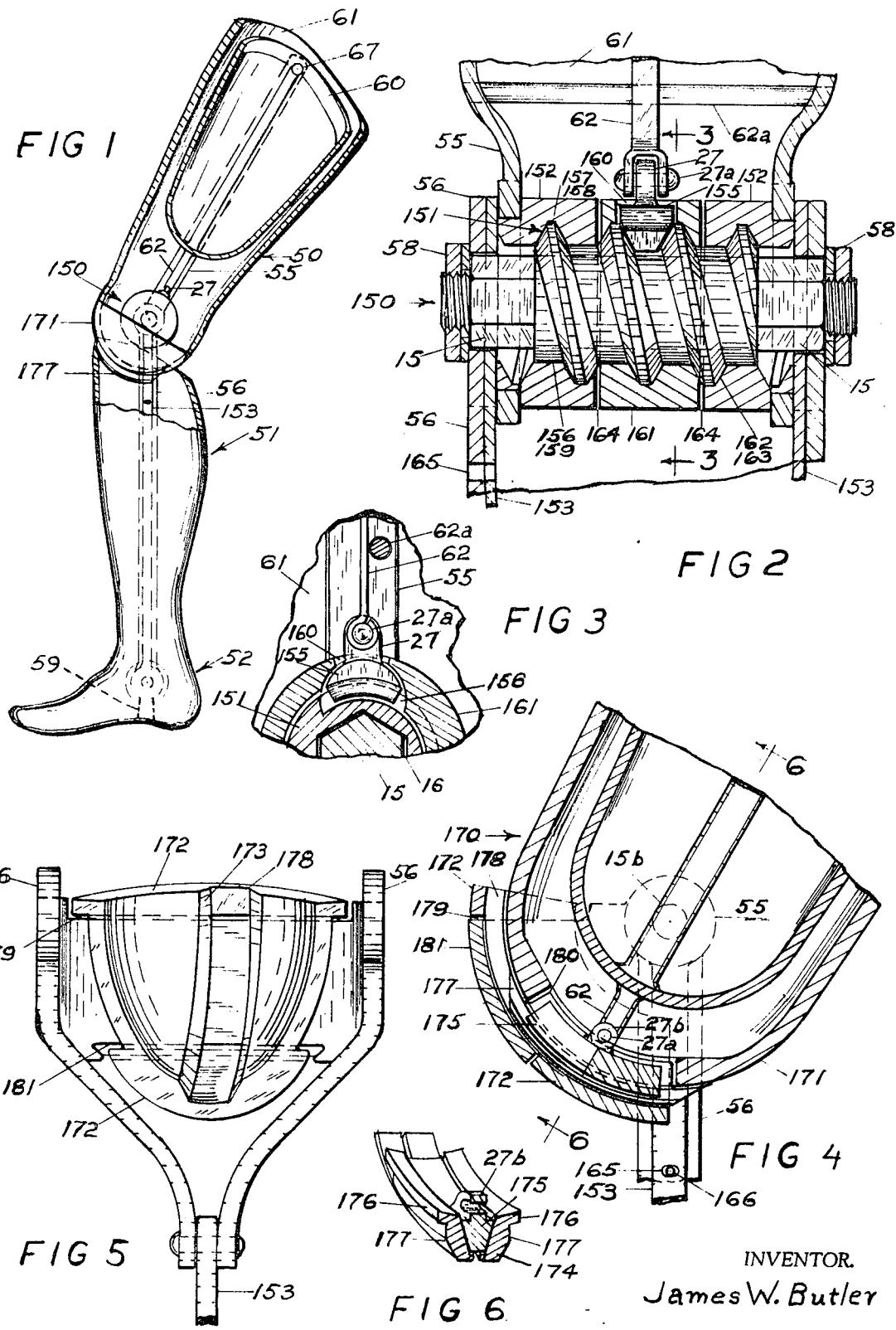
PATENTED MAY 30 1972  3,666,299
INVENTOR.
James W. Butler

FLEXIBLE JOINT INCLUDING BRAKING MEANS

The present invention is a continuation-in-part of application Ser. No. 311,785, filed Sept. 26, 1963, now abandoned.

This invention relates to flexible mechanical joints and to improvements more particularly in but not necessarily limited to artificial legs and similar prostheses; the object of the invention being to provide a mechanical joint which enables periodic braking or cessation of rotation relative to each other of extending elements connected thereto. The three-basic-element flexible and rotary joints with which the present invention is concerned is shown and described in my patent application Ser. No. 311,785, filed Sept. 26, 1963.

In addition to knee and ankle joints for artificial limbs, and the linkage connected thereto for controlling the braking of such mechanisms, the improvement of other such joints is also among the objects of the present invention. The similar joints in a walking-doll or a robot, for example, as well, however, as the flexible and lockable joint of a brace for supporting existing though in some way impaired natural limbs of an individual. Or any similar joint in which the periodic braking or cessation of rotation relative to each other of extending elements connected thereto may be required or desired; preferably to lock such joints against rotation in one rotative direction while still enabling unimpeded rotation in the opposite or reverse rotative direction.

A ball-and-socket type rotary joint, similar to one of two illustrated embodiments of the present invention, enabling swiveling rotation of the extending elements relative to each other, is also among the objects of the present invention in combination with the flexible joint for a mechanical joint, not illustrated, for prosthetic and other devices.

The invention relates to artificial limbs primarily, however, and particularly to improvements in the knee and ankle joints of an artificial leg, with the object being to provide elements for such prostheses that will also operate in a most natural manner, manipulation of which is instinctively initiated by natural reactions of the wearer of the device in the normal processes of walking and rising, as from a seated position, in stooping and bending and even in the stumble recovery occasionally required and experienced by persons with natural limbs.

The conventional prosthesis in present use of this type requires unnatural movements of various portions of the body of the wearer to tense straps or cables riding over rollers to stop or freeze rotation of the respective parts of the braking mechanisms employed. Others, employing wedge action similar to that of the present invention, purposely include unnatural looseness or play at the hinging axle which, though resilient or cushioned to control the play and to prevent rattling, are uncontrollable to the degree necessary for complete reliability. Such looseness or play is necessary for free rotation when unweighted, and, when weighted, for engagement of its wedging or braking elements to stop rotation or further flexure of the limb.

In the foot portion of such existing devices, there is either a complete elimination of flexibility in favor of controllable rigidity or a compromise between the two.

The combination of unnatural manipulation requirements demanded of the wearer also requires a special concentration of thought on every step taken. The required body movements, weight or pressure applications must occur at precise intervals, and pressure, when applied, must continue throughout a complete cycle without relaxation for an instant lest the limb collapses. The same applied pressure used to lock the mechanism against flexure will, in most cases, also lock it against all rotation making it impossible of extension, as when rising from a seated position, when such pressure is applied or continued in the process.

All of the deficiencies are objectionable, contributing to the general discomfort and fatigue of the wearer, but even more objectionable is the unnatural appearance and faltered gait so produced. Additionally, such prior art devices are slow in responding to the will of the wearer, delaying braking action also encouraging use of limit-stops to confine flexure to the more easily controllable range of something less than 15° of rotation. Beyond that range with other devices there is little or no control of flexure and sudden collapse of the limb is possible, with some damage of its elements to be expected.

All conventional devices of the class to which the subject invention pertains depend on friction of related parts for proper operation, including the wedge and grooved pulley types which employ the built-in play or looseness of axis pins. Lubrication of any kind must be carefully avoided with consequent probabilities of occasional frictional sounds being emitted.

It is also among the objects of the present invention to utilize rather than to shun such lubrication and to overcome the other objectionable features and deficiencies outlined. Although friction is a required though minimal factor in the operation of the present invention, provision is made for lubrication of its rotating, sliding and wedging elements. Thereby eliminating all objectionable frictional sounds while adding wearing life to parts often considered as expendable in conventional devices.

Infinite degrees of controlled rotation is provided, within required and optionally planned limits. And flexure can be stopped at any location and resumed or reversed for extension as desired. Extension is permitted even when the mechanism is locked against flexure, making is possible to stand from a seated position with weight applied and using the natural leg stump as the only upward impellent, if it is of sufficient length and strength equal to the task. Braking in flexure will be immediate and instinctive, rather than by thought directed impulse.

Any remaining portion of the leg stump of an amputee can operate the controlling linkage provided in the present invention but the degree of surgery will determine to what extent the leg stump, and the wearer, can successfuly duplicate the performance of the previously operational natural limb. Obviously, the longer and healthier the remaining portion of the leg stump of an amputee, the greater the inherent advantage and strength that will be available to sustain, raise and lower the body weight of the individual in the process of walking, stooping and standing. flexure.

And provision is made for retention intact of the femur bone, when possible, for the longest possible upper leg stump, by elimination of the straight-through hinging axle pin at both the knee and the ankle joint, thus providing for corresponding treatment at the ankle joint in surgery where foot only amputation may be involved.

In many cases, amputations have been made above the knee rather than then the knee even when the knee joint and some portion of the tibia bone could have been retained; possibly because of its expectancy ultimately, but possibly also because prostheses of conventional design function better and are less troublesome to the wearer when of the above-the-knee type. It may be possible in many future such amputations to preserve the entire femur or tibia bone and, possibly, some of the cruciate ligament and other muscle extremities to later be adapted to operate the locking and unlocking controls.

Another object is to provide an artificial knee-joint and ankle-joint either or both to be controlled throughout near full ranges of natural rotation by the leg stump of the wearer. Such control to be exercised also with little or no effort or mental concentration on the controlling elements.

Alternate arrangements for spring-loading of either device is also contemplated, one holding the joint in a neutral or unlocked condition, or locked only against an extension rotation, or another holding it in the normally locked against all rotation condition or only against flexure; the latter requiring an impulse of the leg stump to compress the spring to permit flexure, whereas relaxation of such pressure, or the instinctive resistance to flexure, permits the spring to lock it again.

Spring loading of the device will not alter the capability of the mechanism to reverse its direction for extension of the limb even in the spring locked condition that prohibits flexure. The spring may be a temporary adjunct, to be removed when confidence in the device is gained by the wearer.

While the ankle-joint may be spring-loaded and normally locked against flexure, still permitting unimpeded reverse or extension rotation, or free to rotate when unweighted, or lockable, in either rotative direction, just as the knee-joint, resilient means may also be employed to hold it in any desired position until forcibly rotated; with its locking and unlocking controls to be operated by the leg stump of the wearer of the device whether the ankle-joint is the only such joint in a below-the-knee prosthesis or conjoined with the knee-joint in an above-the-knee prosthesis.

Each joint may be caused to lock or unlock independently of the other or simultaneously with the other, either, when locked, aiding in the locking or unlocking of the other. And, since free yet fully controlled rotation is provided in the ankle-joint of the present invention, eliminating the rigidity of the ankle-joints of conventional design, it will eliminate one of the causes of unnatural torso movements that requires other unnatural torso movements to correct or to compensate for.

The invention then comprises the features herein fully described and as particularly pointed out in the claims, the following description and annexed drawings setting forth in detail certain illustrative embodiments of the invention, these being indicative of but some of the several ways in which the principles of the invention may be employed.

In said drawings:

FIG. 1 is an elevational view, partly in section, of the above-the-knee artificial leg with a movable stump socket shown within a conventional stump socket for pivotal movement of the stump of the wearer of the device to lock and unlock its controls; a screw-wedge mechanism is also shown at the knee-joint and a simulation of a portion thereof, a segment of the thread of the screw, extended to the peripheral bulb or ball surface of the upper leg section;

FIG. 2 is a front elevation, partly in section, of the screw-wedge mechanism showing the rocking wedge within the adjusting sleeve and in contact with the screw and threaded sleeve elements of the unit;

FIG. 3 is a sectional view taken on lines 3—3 of FIG. 2 showing the rocking wedge element within the threaded sleeve element;

FIG. 4 is a side elevation, partly in section, of the ball-and-socket screw-wedge mechanism at the knee-joint of the upper leg and lower leg pivotal axis, with the movable stump socket shown extending beyond the said axis permitting accomodation of the entire thigh portion of the natural leg of the wearer of the device;

FIG. 5 is a rear elevation, partly in section, of the grooved socket and lower leg brace portion of FIG. 4, showing a spirally laid groove to receive the spirally laid screw thread segment affixed to the ball or bulb portion of the upper leg section, with provisions for lateral pivoting or axial rotation of the said socket portion relative to the said leg brace portion and relative to the said ball portion of the unit;

FIG. 6 is an enlarged sectional view taken on lines 6—6 of FIG. 4, showing the three-part screw-thread segment of FIGS. 1 and 4 with the central wedge portion thereof designed to respond to locking and unlocking control much like the rocking wedge and central or locking sleeve portion of the three-part sleeve of FIG. 2.

Referring more particularly to the drawings, the artificial leg of the present invention comprises an upper leg section 50 and a lower leg section 51 to which a foot section 52 is attached. The upper and lower leg sections are pivotally joined together by screw-wedge knee-joint mechanism 150 and respective upper and lower leg braces 55 and 56, as shown in FIGS. 1 and 2; through the lower leg brace 56 and its associated foot brace 59 and a similar knee-joint (ankle-joint) mechanism. The lower leg and foot sections are also pivotally joined together although not so illustrated.

As shown in FIG. 1, a movable stump control socket 60 is within and pivotally attached at its upper extreme to a conventional stump socket 61 by socket pin 67, to permit pendulum movement of the leg stump of the wearer of the artificial leg within the conventional stump socket, to control flexure of the limb through the knee-joint mechanism 150; the said stump control socket being linked to the control members of the said mechanism, the rocking wedge 155 and locking sleeve 161, through control linkage 62 and wedge bracket 27 and pivotally held by pin 27a, as shown more clearly in FIG. 3.

In partial illustration of the alternate ball-and-socket screw-wedge knee-joint mechanism 170 of FIG. 4, a portion of it is also shown below the pivot of the knee-joint in FIG. 1, with a simulation of its screw-thread 177 also included only to show its positioning; the said screw-thread being also shown in FIG. 6 as a three-part screw-thread unit comprising two half-thread segments 177 and a lengthwise and depthwise tapered sliding wedge 175.

The three-part screw-thread unit is also shown in FIG. 4 within socket 180 which allows for widthwise expansion of the wedging unit while buttressing it in flexure and extension rotation; the said unit being held within the said socket by flanges 176 after the sliding wedge 175 is inserted between the half-thread segments 177, the said wedge being held in position by control linkage 62 pivotally held by wedge bracket 27b and pin 27a.

In the knee-joint 150 of FIG. 2, the threaded sleeve 152 will be first considered as when continuous of length, rather than as the three-part unit illustrated, which though otherwise cylindrical is shown rigidly connected at hexagonal ends to the upper leg section through correspondingly bored upper leg braces 55, both to rotate in unison relative to the screw 151 and to the lower leg braces 56 of lower leg section 51.

The spirally formed screw 151 is in threaded relationship with and within the correspondingly spirally threaded sleeve 152 and also in axially sliding relationship, through its hexagonal bore, with hexagon shaft 15; to enable transverse movement of screw and sleeve threads 157 and 159 relative to sleeve and screw grooves 158 and 156 respectively, which is unnecessary in a straight-away tongue-and-groove relationship. Hexagon shaft 15, extending to both axial ends of the unit, also passes through the hexagon bore of extension arms 153 and the circular bore of lower leg braces 56, ending in a rounded and partially threaded end-piece to receive a washer and a threaded fastener 58 at both ends to bind all parts in rotatable connection with each other; with the screw and related parts designed to rotate with the lower leg section 51 relative to the threaded sleeve 152 and relative to the upper leg section 50.

In FIG. 3, and again in FIG. 2, a rocking wedge 155 is shown in sliding relationship with the screw groove 156 of screw 151, replacing a portion of the sleeve thread 159, and in partial ball-and-socket relationship with and within socket 160 of sleeve 152 (when continuous of length), so that the wedge may rotate within the socket but other than inwardly or radially not otherwise be displaced while moving with sleeve 152 as it rotates relative to screw 151.

The rocking wedge 155 is pivotally connected by its bracket 27 and pin 27a to the control linkage 62 rigidly affixed to the stump control socket 60 which, when rotated by the leg stump of the wearer, is designed to rotate the said wedge to stop all relative rotation and axial sliding of movable parts in one direction, as in the flexure of the limb, while still permitting the rotation and axial sliding of the same parts in the reverse direction; thereby permitting extension of the limb even while it is locked against further flexure.

It is readily apparent that the applied weight alone of the wearer and mere depression of a flexible stump control socket 60 will effect sufficient radial movement and wedgment of wedge 155 in the screw groove 156, while still being buttressed in and by socket 160, to produce a satisfactory frictional braking control of the device; whether in a spirally laid groove or one straight or continuous of length.

It is also apparent, however, that without a stump control socket (60) the same radial movement of wedge 155 may be effected by the longitudinal pressure of the leg stump, of the wearer of the device; within a conventional stump socket (61), with just the compression of flesh permitting the pendulum movement also, of the femur or tibia bone relative to the socket and to bracket 27, to effect all controls of either or both the knee and the ankle joints.

Also, except for mere radial depression, the rocking wedge 155 will be positive in its wedge action within the illustrated cooperatingly tapered groove 156...with its lines of force directed across, rather than with, the circular lines of the base of the groove...and it will still require less effort to produce and hold any such wedgment in a spirally laid groove than in one of straight-away or endlessly circular formation, dependent only on friction for braking. A groove of square, rather than of tapered, cross-sectional formation that would be totally ineffective in a straight-away tongue-and-groove relationship in the mechanism of the present invention will be sufficiently effective when also spiral of formation.

And while in the foregoing description it is evident, in FIG. 1, that a counter-clockwise rotation of the stump control socket 60 will cause a clockwise rotation of the rocking wedge 155, in FIG. 3, when a counter-clockwise rotation of it is needed to stop the counter-clockwise rotation of screw 151 in flexure of the limb, when within the locking sleeve 161, as illustrated in FIG. 2, the rocking wedge is designed to pivot in the direction most effective in producing buttressed wedgment in the said screw groove 156 and in the rotative direction of the said screw in which such wedgment will lock the mechanism against further such rotation while still enabling its reverse rotation.

In FIG. 2, the locking sleeve 161 is interposed between and threaded similarly to two sections of the then three-part threaded sleeve 152. And, when the said threads are continuous of corresponding condition from one sleeve to the other, all three will mate with and freely slide in spiral rotation around and relative to the similarly threaded screw 151.

If, however, the locking sleeve 161 is rotated relative to the screw 151 and in a direction opposite to the rotational direction of the other two sleeves 152 one or the other of gaps 164 will close between two of the three sleeves disrupting the continuity of the threads from one to the other of the affected two sleeves impeding continued rotation in that direction of all of the sleeves relative to the screw 151; while still permitting free rotation in the opposite rotative direction.

The impeding action will be one of intensified friction between the normally spaced but then abutting sides of the respective threads 163 and 162 of the sleeves and the screw. But, unlike that involving straight or circular wedges within straight or endlessly circular grooves, wherein friction alone is relied upon, the torque force involved will be directed across the spirally laid grooves 156 of the screw 151 not only intensifying the said friction, while minimizing the effort required to resist the frictional sliding, but also requiring the shearing (stripping) of respective threads before further rotation could continue; the strength of the respective threads alone, perhaps, determining the ability of the mechanism to contain the said force.

In FIG. 2 the combination of both the rocking wedge 155 and the locking sleeve 161 is shown. And it should be noted here that locking of the mechanism can be effected in one of two ways: the stoppage of rotation of the screw 151 relative to the threaded sleeves 152 or the stoppage of the lateral or axial movement of the screw 151 relative to the shaft 15 and the threaded sleeves 152.

The rocking wedge 155 in wedgment with the groove of screw 151 will stop rotation and, to a minor degree, axial movement of the threaded sleeves 152 relative to the said screw. The rotation with sufficient force of the locking sleeve 161 relative to the threaded sleeves 152 will also stop axial movement in the opposite direction of the screw 151 by the bottoming effect caused by the misalignment of respective threads. It will also impede relative rotation but to a greater or lesser degree determined by the pitch of the respective threads.

In the combination of the rocking wedge and locking sleeve lockments, the efficiency and effectiveness of the combination will be the sum of their combined individual efficiency and effectiveness.

Simultaneous action of both rocking wedge 155 and locking sleeve 161 adds the effect of the one to the effect of the other, as seen with pivotal rotation of both in the same direction in FIG. 3, in that the wedgment of the rocking wedge within the screw groove 156 assists in the desired movement of the locking sleeve 161 binding the respective abutting faces in such manner as to stop all rotational and axial sliding movement therebetween in either desired rotative direction.

The locking sleeve 161 will act similarly to a locking nut used in conjunction with a conventional or similar nut on a threaded rod. When slightly separated, both may turn together in either rotative direction, but when the locking nut is tight against the conventional nut, representing either of sleeves 152, neither may rotate in a direction toward the other but either may rotate in a direction away from the other if otherwise unimpeded. And it requires relatively little effort to hold either while binding both by rotating the other.

Sufficient radial spacing between the screw 151 and any one of the described sleeves, plus a resilient bushing or other means to provide such play at their common pivotal connections, will also permit weighted wedgment and a satisfactory lockment of the mechanism, without a locking sleeve 161 or a rocking wedge 155. And while similar controls will be used with the single-threaded cup-shaped or ball-and-socket adaptation of the screw and threaded sleeve mechanism, in many instances of application mere compression of the three basic elements in tight bond with each other is deemed to be sufficient braking control in any adaptation of the present invention.

Since less than a full thread is sufficient for either joint of an artificial leg, 120° of rotation at most, for the knee-joint, being required or positional, it enables use of a segment only of the thread 177 on the outer area of the ball 171 as shown in FIG. 1 and, as shown as a three-piece thread unit 177, in the ball-and-socket adaptation shown in FIG. 4. This will permit the location of mating threads, thread unit 177 and groove 178, at the greatest distance from the axis of the joint as size and proper contour of the limb will permit, thereby reducing the torque force in corresponding proportion to any increase in the size of the limb which also increases the radius of the said ball 171.

Use of the ball-and-socket type unit also eliminates the need for an intruding axle pin within the stump socket, since all pivotal means can be placed on the outside of the unit; with the controls on the outside also and/or operated from within. In this way a stump socket may be formed as a hollow cylinder, closed at the knee joint area in ball formation, to accommodate the complete upper leg of an amputee with the entire femur bone left intact; providing utility of the leg stump not possible with stump sockets of conventional design. The ankle-joint area may be formed in the same way.

In FIG. 4, the ball portion 171 of screw-wedge mechanism 170 is part of the upper leg section 50, braced by upper leg braces 55 and adapted to pivot with the lower leg braces 56 on threaded button fasteners 15b on the outside of the said ball portion. The three-part screw unit 177, including a sliding wedge 175 and two half-threads 177 as shown in FIG. 6, is held in the sliding wedge socket 180 which permits slight widthwise movement of the said half-threads caused in any depression or clockwise sliding of the said wedge.

The socket portion 172, as shown more clearly in FIG. 5, carries on its concave face the mating groove 178, to receive and cooperate with the screw unit 177, and, on its convex face, a transverse channel 179 to receive and cooperate with a similarly formed transverse arch 181 partially formed in the lower leg brace unit 56; permitting the ball socket 172 to slide laterally in axial rotation relative to both the ball and screw unit and the lower leg brace unit when the upper and lower leg sections and their related parts rotate relative to each other.

Although the functioning of similar parts in the screw and threaded sleeve and the ball-and-socket screw-wedge mechanisms 150 and 170 may differ slightly, the operation and control of both is identical. The natural and instinctive pivotal movement of the leg stump of the wearer in bending and straightening the leg and holding any position of flexure will be transferred to the stump control socket 60 which duplicates the said pivotal movement within the conventional stump socket 61, pivoting at socket pin 67 joining the two said sockets, as shown in FIG. 1.

Such pivotal movement of the stump of the wearer when resisting flexure or stopping it, or when forcibly extending the limb from a stooped position, is equivalent to a counter-clockwise rotation of the stump control socket 60 at socket pin 67 as illustrated. This causes a pivoting of control linkage 62 at axis pin 62a and a forward rotation of locking sleeve 161 as it is shown in FIG. 2 which is equivalent to a counter-clockwise rotation of it and the rocking wedge 155 rotating within it, as shown in FIG. 3. This causes a wedgment and a binding of respective threads, as previously explained, with screw 151, which rotates counter-clockwise, as illustrated, in any flexure of the limb, thereby prohibiting further flexure; even though at any position of flexure re-extension may begin. Any reversal of the pivotal movement or mere relaxation of the stump will permit further flexure, while mere rigidity of the stump without movement will permit automatic or self-operation of the locking controls.

Forcible re-extension of the limb, while weighted and still in the same condition of lockment against further flexure, will reverse the relative rotative direction of screw 151 causing a retreat from or a withdrawal of the wedgment of wedge 155 in the screw groove 156, without altering the position of the wedge. A frictional reverse rotation of the locking sleeve 161 will also be caused, if more than the normal slack or spacing between the respective screw and sleeve thread faces 162 and 163 is needed, reopening the gap 164 that the same frictional force in abutment with the said screw faces aided in closing, sufficiently realigning misaligned respective threads while maintaining all other conditions of lockment against flexure; which lockment would be self-effected, if the force of extension is relaxed, again by the same frictional closing of the frictionally opened gap 164.

The two half-threads of screw unit 177 and the sliding wedge 175, of mechanism 170 as shown in FIG. 6, will react in flexure and extension similarly to the three-part sleeve (152 and 161) of FIG. 2; although it should be noted that the function of the two elements may be reversed, with the screw threads designed to slide and expand, in either rotative direction, relative to a then fixed wedge.

As illustrated, however, the same pivotal movement of the stump and stump control socket 60, counter-clockwise, that rotates the rocking wedge 155 and locking sleeve 161 counter-clockwise will also slide the sliding wedge 175 in a clockwise direction, relative the half-threads 177 and to to the groove 178 of ball socket 172 which rotates with the lower leg section 51 counter-clockwise relative to the screw unit 177 in any flexure of the limb. Friction between the taper faces 174 of the expanding screw unit 177 and the groove side faces 173 while aiding in the self-expansion of the unit also stops further rotation of the said ball socket which, in cooperation with its transverse channel 179 and the transverse arch 181 of the lower leg brace unit 56, stops further flexure of the limb.

Forcible re-extension of the limb will reverse the relative rotation of the ball socket 172, with the frictional force of the groove face 173 against the screw face 174 withdrawing the wedgment of wedge 175 and the expansion of screw unit 177; permitting the re-extension. The same frictional force will self-expand the screw unit 177 when the force in the extension direction ceases or is relaxed, relocking the mechanism against flexure. Cam-like abutting ends of the respective sleeves 152 and 161 will produce similar effects in the mechanism 150 shown in FIG. 2.

Complete reversal of the controls of either mechanism 150 or 170, clockwise as viewed in FIG. 3, will lock the limb in the rotative direction of extension. Such a condition will be needed when the limb is weighted but when unweighted it will be desired only at the beginning of a forward swinging movement of the limb preparatory to the next weighted step; thereafter, free pendulum movement is desired, being obtained with the least frictional resistance in the present invention when the controls are in the neutral position: somewhere between the two extremes.

Holding a stooped and weighted position requires a counter-clockwise rotation of the controls, also as viewed in FIG. 3, regardless of the position of the stump and control socket 60 relative to the conventional stump socket 61 shown in FIG. 1; holding the said stooped position is also dependent on the range of the controls and the strength of the mechanism...the weight of the wearer and the permissible or desirable weight of the mechanism being both considered and, perhaps, determining factors.

Holding the stooped and weighted position is, of course, accomplished by continued exertion of pressure of the stump in the same counter-clockwise direction that locks the limb against further flexure. It is also desirable, and possible in the present invention, to maintain such a position with the said pressure of the stump relaxed, without collapse of the limb; and even though relaxation of the stump will cause its involuntary pivoting, and the pivoting of the control socket 60, to the clockwise extreme. The latter condition, and a previous unfortunate circumstance, is also possible in an upward step, as at a street corner sidewalk curb, for example, if in the upward step the step is kicked before clearing it. The limb in such instances would unavoidably collapse if the controls were also permitted to rotate to the clockwise extreme (the counter-clockwise extreme in FIG. 4), being locked then only against extension and free to rotate in the opposite or collapsing direction.

The controls of the present invention may be spring loaded and normally locked against either flexure or extension, requiring pivotal movement of the stump and control socket 60 to free either lockment. As illustrated in FIGS. 2, 3 and 4, however, they are considered as being normally locked against extension prohibiting any but wanted and controlled extension.

In the unweighted forward swinging movement, preparatory to the next weighted step, partial flexure will be held until free extension is wanted and acquired by the partial or total rigidity of the stump; with the pendulum movement of the lower leg and foot sections self-releasing the lockage against extension.

Stooping, or flexure of the limb, may proceed without release of the lockage against extension, but lockage against further flexure in the stooped position can be accomplished and maintained with exerted or relaxed pivotal movement of the stump and control socket 60.

Exerted pivotal movement of the stump or the control socket 60 counter-clockwise as illustrated in FIG. 1 will cause the control linkage 62 to pivot at axis pin 62a, causing a counter-clockwise rotation of locking sleeve 161 and the rocking wedge 155 within it, as illustrated in FIG. 3, and a clockwise sliding of sliding wedge 175 in FIG. 4, with a consequent lockage of either mechanism, 150 or 170, as previously described, against further flexure.

However, it is evident also in the same illustrations, with the control linkage 62 unimpeded by the axis pin 62a in any movement of it in the opposite direction, that an exerted or relaxed pivotal movement of the stump or control socket 60 in the opposite or clockwise direction will also cause a counter-clockwise rotation of the controls of FIG. 3 and a clockwise sliding of wedge 175 in FIG. 4, locking either mechanism 150 or 170 against further flexure or against accidental collapse; as in the example in an upward step: of kicking a curbstone before clearing it.

The natural ankle joint provides rotary movement of the foot relative to the lower leg in three rotative directions: circumferentially, with respect to the knee-joint 150 of FIG. 2, and axially in both the vertical and horizontal directions; but with the combined use of only the circumferential and vertical axial rotations.

Therefore there is no need for a horizontal axial rotation in the ankle-joint but there is in an elbow-joint also contemplated within the scope of the present invention.

The ball-and-socket knee-joint 170 of FIG. 4 will provide a horizontal axial rotation, but to the sacrifice of the vertical axial rotation which is also needed in an artificial elbow joint; providing both will require the use of an intermediate ball-socket element between ball-socket 172 and the transverse arch 181. As viewed in FIG. 5, however, with the transversing tongue-and-groove relationships reversed, at least 180°of horizontal relative rotation can be provided with a horizontally aid socket groove 178 and a circumferentially laid transverse channel 179; in straight-away or diagonally laid tongue-and-groove relationships.

Placement of the transversing tongue-and-groove relationships for circumferential and for vertical axial rotation in an ankle-joint 170 will provide sufficient forward and backward as well as sideward foot and lower leg relative rotative movement, to the sacrifice of no needed swivelling rotation; with the ease of controlling wedgment and lockage of the ankle-joint against all such rotation greatly enhanced by use of diagonally laid tongues and grooves in both relationships.

Sideward foot movement, the said vertical axial rotation, will require resilient or cushioned longitudinal play at the hinging axis of the foot and lower leg sections, 51 and 52 respectively. But, while such play is objectionable and unnatural in the knee-joint, it will cause no unnatural movements in the said circumferential rotation of the ankle-joint; the equivalent of the flexure and extension rotative directions or movements of the ankle-joint.

Extension arms 153 are shown non-rotatably connected to the hexagon shaft 15 of the screw-wedge mechanism 150 in FIG. 2, and rigidly connected to the lower leg brace unit 56 of screw-wedge mechanism 170 in FIGS. 4 and 5. While optionally connectable to and pivotal with the foot brace 59 or non-rotatable with the hexagon shaft 15 of a smaller ankle joint mechanism 150, to stabilize the screw 151 of both knee and ankle joints, they may also be directed to and be pivotally connected with controls at the ankle joint, similar to those at the knee-joint, and provided with sufficient pendulum movement independently of the lower leg braces 56, such as at key slot 165 shown in FIG. 4, elongated to permit traverse movement of pin 166, to control similar ankle joint mechanisms; through the locked knee-joint then a rigid part of the upper leg section 50 and a rigid extension of the same pivotal movement, of a sufficiently healthy stump of the wearer, that first locks the knee joint. Locking or unlocking of the knee-joint will be accomplished in the reverse, with the ankle-joint held or locked against rotation.

The braking, or mechanical, advantage of the wedge in a spirally or diagonally moving groove, over that of a straight-away or circumferentially formed groove, with the torque force of flexure of the artificial limb then directed across diagonally laid grooves, can be compared in reverse to that of a screw-jack, which loses up to 50 percent of its efficiency to friction when load-resisted. The required braking or applied resistance, which may be in the form only of radial compression of the respective sliding parts, may therefore be as much as 50 percent less in the knee-joint of the present invention than that required in others employing grooves and wedges of conventional design, to control flexure of an artificial leg.

The relative reduction of the force required to resist flexure or extension of the limb would be determined largely by the angle of the diagonally laid groove with respect to the axially transversing groove; the optimum being 45°. However, much of the mechanical advantage afforded by the said optimum angle or thread pitch may be sacrificed in favor of freer rotation when the prosthesis is in a suspended or unweighted and unlocked condition; although spring means may be provided to assist in wanted such rotation when desired or required.

The flexible knee-type joint of the present invention comprises three basic elements: two in rotatable connection with each other, each rigidly affixed to separately appended leg sections, with the third element intermediate of and in tongue-and-groove or similar connection and sliding relationship with the other two elements; and designed to slide in one direction relative to one of the said two elements while sliding in a transverse direction relative to the other.

Just as is the rocking wedge 155, when pivoted in socket 160 of locking sleeve 161 (FIG. 3), positive in its wedge action and non-dependent on friction for holding a reversible position, by directing its lines of force across the curved base of the groove 156, as previously explained, so also may the three-basic-element screw-wedge mechanism be arranged to eliminate dependency on friction; by eccentric rotation of one or more of its normally concentricaly rotatable parts or elements relative to one another.

However, the basic principle involved in the screw-wedge mechanism is rather the directing of all torque force involved across any type of a groove, instead of in the direction of the groove, minimizing any dependence on friction for containing the said force; with a screw-jack serving as an example in the reverse, wherein the torque-force is utilized to lift or move a load, whereas in the screw-wedge mechanism the sides of the respective grooves are designed to contain the torque-force produced by a load.

Although the ball-and-socket adaptation, mechanism 170, of the screw and threaded sleeve mechanism 150 is shown as segments of a ball and mating socket, with the ball portion affixed to and rotatable with the upper leg section 50 and with the socket portion 172 a part of and so rotatable with the lower leg section 51, the respective leg connections of the said ball and socket portions may be reversed.

Similarly, a segment of mechanism 150, the upper concave portion of the sleeve 152, for example, singly or in pairs, may also be connected to the upper leg section 50 and in either the straightaway or diagonally laid, or oppositely diagonally laid, grooved relationship with a mating screw or segment thereof, be utilized to more nearly duplicate the natural three-part wedge mechanism of the human knee-joint; with the upper and lower leg sections joined in a manner to rotate with or within or, more naturally, rocking away from each other.

The male thread or screw portion utilized may be straight or spirally laid, as illustrated for the screw and threaded sleeve mechanism 150, and attached to or as part of a cylinder or rod of circular cross-section, or flat and attached to or as part of a flat plate, or curved to the contour of a spherical or concave or convex shaped disc, bulb or ball. Or it may be continuous as a circle or ring, any one of which threads may be round, oval, square or of any cross-sectional shape; its mating element or mating female portion being cooperatingly similar in shape.

A leg brace is also contemplated, within the scope of the present invention, for the individual who through paralysis or other cause may have lost the use or control only of his natural leg or the joints thereof. Which auxiliary joints may be actuated by the same instinctive and natural impulses and reactions that control the artificial knee-joint. Or they may be utilized only as rapid locking and unlocking hinge mechanisms for such braces.

While the seeming bulk of screw-wedge mechanism 150, and its unavoidable excess of weight, would be a deterrent to its use in an artificial leg if used as illustrated in FIG. 2, where such a consideration is not a factor, other improvements by its use are contemplated; in the joints of steam-shovel arms for example. For the knee-type joint between the power (thigh) portion and the lower ("leg") portion, as well as between it and the shovel or bucket (foot) portion; to relieve the strain on its arm extending and flexing cables...its "muscles."

With the reversal of the tongue-and-groove relationships of the ball-and-socket screw-wedge mechanism 170, as illustrated in FIG. 5 and as previously explained, 180° of swiveling rotation is enabled and which is sufficient for any such rotation required of an artificial elbow-joint. In the same manner, however, 360° of such swiveling rotation is also enabled for improvements in other devices, equally within the scope of the present invention; a combination clutch and universal-joint, for example, similar to an elbow-joint but to join two off-set from the parallel longitudinally extended shafts for intermittent rotation relative to each other.

Ball socket 172, of FIG. 5, then as one of two or more intermediate elements, will be more fully cupped but slanted of outer lip, diagonally circumferentially when both leg sections 50 and 51 are extended; into or by which outer lip a groove 178 will be formed, then continuously circular, for engagement of a then continuously circular ring affixed to the ball portion 171 of upper leg section 50, laid diagonally circumferentially replacing partial thread 177.

Ball socket 172 will also have a tongue or groove on its convex face, for engagement with a similar intermediate element designed in turn to engage the equivalent of transverse arch affixed to lower leg section 51, extending from the high and low points of said outer lip in an longitudinal arc formed transversally of the said groove 178; not to enable flexure of said leg sections but to enable oscillation of the said intermediate element, ball socket 172, expected when one leg section is rotated relative to the other.

The assembly will be held in swiveling rotatability by a circumferential band, and when one leg section is rotated relative to the other, not flexed, the continuous thread or ring 177 will wobble back and forth longitudinally while sliding within endless groove 178, causing the intermediate ball socket 172 to also wobble with it, while the tongue-and-groove engagement on its convex face in slidable connection with the second intermediate element and with the equivalent of transverse arch 181 enables its sliding oscillation the latter being then keyed to the lower leg section 51 to cause its rotation in unison with the upper leg section 50 when all sliding within the joint ceases or is caused to be restrained.

Provisions may be made for braking or the restraining of all rotating and sliding relative to each other of the rotatable and tongue-and-groove engaged elements; by mere longitudinal compression or eccentric rotation or other wedgment. But it can readily be seen that even without such provisions, and even though all elements were amply lubricated, if the circular ring 177 and its engaged groove 178 were laid or cause to be adjusted beyond a certain angle of pitch diagonally circumferentially, say 45°, from the perpendicular to the jointed-shaft so produced, the friction created at such an angle by any applied torque-force would prevent any sliding of the related element relative to each other.

It is also among the objects of the present invention, therefore, to provide a power transmission clutch which will engage and disengage clutching elements within it automatically; among other means, by automatic adjustment of the pitch of the circumferentially laid ring 177 and groove 178. Which will eliminate the need for physical or other such engagement and disengagement of similar elements, eliminating also the need for a fluid-coupling...wherein oil is pressurized and forced by one fan against, as well as through, the blades of a similar fan...which is now necessary in an automobile, for example, in lieu of a disengageable clutch, to enable an engine to continue to operate when the wheels it is driving are locked; as when stopped by a red-light.

Considerable lost motion is involved with use of the fluid-coupling, although it does perform an additional function: that of providing pressured oil to automatically change gearing ratios; which could also be eliminated by use of variable ratio gearing...such as is described in my U.S. Pat. No. 3,381,544.

With the circumferentially laid ring 177 a part of, or in slidable engagement within groove 178 of, a spherical ball, and said ball also in transverse or longitudinally tongued engagement with one extended leg section, and with a cupped intermediate element in continuous slidable engagement with said ring, circumferentially, and in transverse longitudinally tongued engagement with the other extended leg, the encircling band holding all elements in rotatable connection may also be adapted to enable the limited flexure of the extended leg sections required of a universal-joint and similarly to that of an artificial elbow-joint.

Resilient or other pressure inducing means may also be employed in the assembly, to urge said ring 177 to an extreme angle of pitch from the perpendicular to the jointed-shaft, while the friction created by it and the torque-force directed against sliding side faces tends to neutralize such urging, holding the said ring and its associated elements at or near to the radial said perpendicular when simultaneous rotation of both extended legs or their relative rotation is resisted. Under such urging, however, the said ring 177 and its associated elements will be caused to gradually and eventually slide rotatively to the extreme angle of pitch permitted, when both extended leg sections are free to rotate simultaneously and when the resistance to such rotation diminishes or ceases; preventing all further lost motion or "slipping" in continued rotation.

Since most overriding clutches could automatically disengage and re-engage their usually wedging elements, particularly those employing rollers or balls in tapered cage confinement, if one said element could conveniently be retarded in its rotation sufficiently long to permit another element to catch up with it, or to permit its wedgment with another element to be effected, the elements of the mechanism of the present invention may be utilized also for the purpose only of retarding one such element relative to another in existing overriding clutches.

Having thus described the invention what is claimed as new and desired to secure by Letters Patent is:

1. In a flexible joint having an upper section and a lower section, an internally threaded ring secured to one of said sections; a screw secured to the other of said sections and in engagement with said internally threaded ring; and wedge means in contact with said internally threaded ring engaging said screw; said means being adjustable to secure said internally threaded ring and said screw against rotation relative to each other, to thereby restrain the flexure of the upper and lower sections relative to each other.

2. The combination of claim 1 wherein the said wedge is internally threaded and in threaded engagement with said screw.

3. The combination of claim 1 wherein the upper section is provided with means linked to the said wedge means; said means being adjustable, as by the leg stump of the wearer of an artificial leg having such a device, for example, to optionally adjust the said wedge means to control flexure and extension of the upper and lower sections relative to each other.

4. In a flexible joint having an upper section and a lower section, a tongued member secured to one of said sections; a grooved member secured to the other of said sections and in tongue-and-groove relationship with the said tongued member, both said members being secured for relative rotation therebetween; and wedge means in engagement with the said tongued and said grooved members; said means being adjustable to secure said members against rotation relative to each other, to thereby restrain the flexure of the upper and lower sections of the flexible joint relative to each other.

5. The combination of claim 4 wherein the tongue and the groove of the tongued and grooved members, respectively, are diagonally laid or spiral of formation; and wherein means is provided to enable one of said members to slide relative to the other in a direction transverse of the said tongue and said groove.

6. The combination of claim 4 wherein the said tongue-and-groove relationship is one of depth-tapered or wedge-groove cros-sectional formation.

7. The combination of claim 4 wherein the wedge means is both tongued and grooved, thread-like, and in tongue-and-groove relationship with at least one of the said tongued and said grooved members.

8. The combination of claim 4 wherein the wedge means is expandable and contractible.

9. The combination of claim 4 wherein the wedge means is adjustable to secure said tongued and said grooved members against rotation relative to each other in one rotative direction while enabling unimpeded reverse rotation.

10. The combination of claim 4 wherein the wedge means is adjustable to secure said tongued and said grooved members against rotation relative to each other in either selective rotative direction while enabling reverse rotation.

11. The combination of claim 4 wherein the upper section is provided with means linked to the said wedge means; said means being adjustable, as by the leg stump of the wearer of an artificial leg having such a device, to optionally adjust the said wedge means to control flexure and extension of the upper and lower sections relative to each other.

12. The combination of claim 4 wherein the lower section is provided with a longitudinal extension linked to the tongued or grooved member secured to the said lower section; said extension being extendable and linkable to a similar flexible joint when existent at the opposite extreme of said lower section, such as an ankle-joint in an artificial leg, and adjustable independently of other bracing means to control flexure and extension of an additional (foot) section when the first said flexible joint is locked against flexure.

13. In a mechanical joint, a rotatable actuator element and a rotatable constrainer element, both secured for relative rotation therebetween; and an intermediate element interposed between and in locked-in but slidable relationship with both of said rotatable elements; said intermediate element being adapted to slide in one direction relative to one of said rotatable elements and simultaneously to slide in a transverse direction relative to the other of said rotatable elements to thereby enable the aforementioned relative rotation therebetween; said intermediate element being also adapted to obstruct the aforementioned relative rotation when it is caused to be slidably immovable relative to one of said rotatable elements.

14. The combination of claim 13, wherein means is provided enabling compressive movement of one of the rotatable elements relative to the other rotatable element and relative to the intermediate element, to thereby restrain slidable movement of one element relative to another, restraining also the rotation of one of the rotatable elements relative to the other.

15. The combination of claim 13 wherein the intermediate element is comprised of at least two sub-elements in similar locked-in but slidable relationship with each other and/or with the said rotatable elements.

16. The combination of claim 15, wherein one locked-in but slidable relationship as aforementioned is alterable relative to another, to enhance or inhibit rotation and sliding of one rotatable element relative to another; or to enable uninhibited rotation and sliding thereof.

17. The combination of claim 15, wherein means is provided to alter one locked-in but slidable relationship relative to another, to enhance or inhibit rotation and sliding of one rotatable element relative to another; or to enable uninhibited rotation and sliding thereof.

* * * * *